SPEED REGULATING MECHANISM

Filed May 22, 1959

INVENTOR.
ROBERT H. THORNER
BY [signature]

United States Patent Office 3,068,849

Patented Dec. 18, 1962

3,068,849
SPEED REGULATING MECHANISM

Robert H. Thorner, 19754 Monte Vista, Detroit 21, Mich.

Filed May 22, 1959, Ser. No. 815,177
31 Claims. (Cl. 123—103)

The present invention relates to speed regulators, particularly but not necessarily, for automotive engines, and is particularly directed to novel fluid servo-mechanisms.

The present application is a continuation-in-part of my applications, Serial No. 754,736, filed August 13, 1958, entitled "Engine Governor" (now Patent No. 2,887,999); Serial No. 743,542, filed June 23, 1958, entitled "Fluid Powered Governor"; and Serial No. 683,318, filed September 11, 1957, entitled "Fluid Pressure Sensing Governor."

In regulators having a fluid servo-motor controlled by a pilot valve, such as speed regulators, the elimination of undesirable fluid static and dynamic forces acting on the valve has always been a puzzling problem. This problem is significant in modulating type pilot valve structures, and is most severe in the environment of the single-acting type servo-motor. When a "closed-loop" regulator is responsive to a controlled condition, it is usually desirable for the pilot valve to respond to changes in the controlled condition substantially independent of static and fluid dynamic forces acting on the valve.

The disturbing or unbalancing fluid forces acting on a pilot valve, as above discussed, are produced by at least two basic factors. One important factor is the variation in the source pressure acting on the pilot valve, particularly when such variation is significant in relation to the sensing or signal forces which actuate the pilot valve. Another factor, *for a constant value of the source pressure*, comprises the two fluid force variations acting on the pilot valve as the valve travels throughout its operating range; one of these fluid force variations comprises the changes in force produced by the static pressure acting on the uncompensated but varying area of the pilot valve which is exposed to the source pressure; the second of these force variations is the fluid dynamic (Bernoulli) effect produced on the pilot valve by the changing velocity of the controlled fluid as the valve changes its travel-position.

A principal object of the present invention is to provide a fluid servo-type regulating device, such as a speed regulator, including a pilot valve, in which novel means are provided to compensate for variations in the source pressure acting on the pilot valve.

Another object of the present invention is to provide a speed regulator for an internal combustion engine, which includes the novel compensating means mentioned in the preceding paragraph, and which compensating means is utilized in cooperation with the variation in engine vacuum resulting from changes in the throttle opening to provide any desired speed-droop or regulation.

Another object of the present invention is to provide a speed regulator for an internal combustion engine of the type described in the preceding paragraph in which the elements of the combination are arranged to produce greater stability than otherwise obtained.

Another object of the present invention is to provide a pilot valve in a fluid servo-type regulating device, in which the configuration of the pilot valve and its seating members compensate for or eliminate the variations of the fluid static and dynamic forces acting on the pilot valve throughout its travel, by maintaining a constant force acting on the pilot valve.

These and other objects which will appear more clearly as the specification proceeds, are accomplished, according to the present invention, by the arrangement and combination of elements set forth in the following detailed description, defined in the appended claims and illustratively exemplified in the accompanying drawings, in which:

Figure 1:
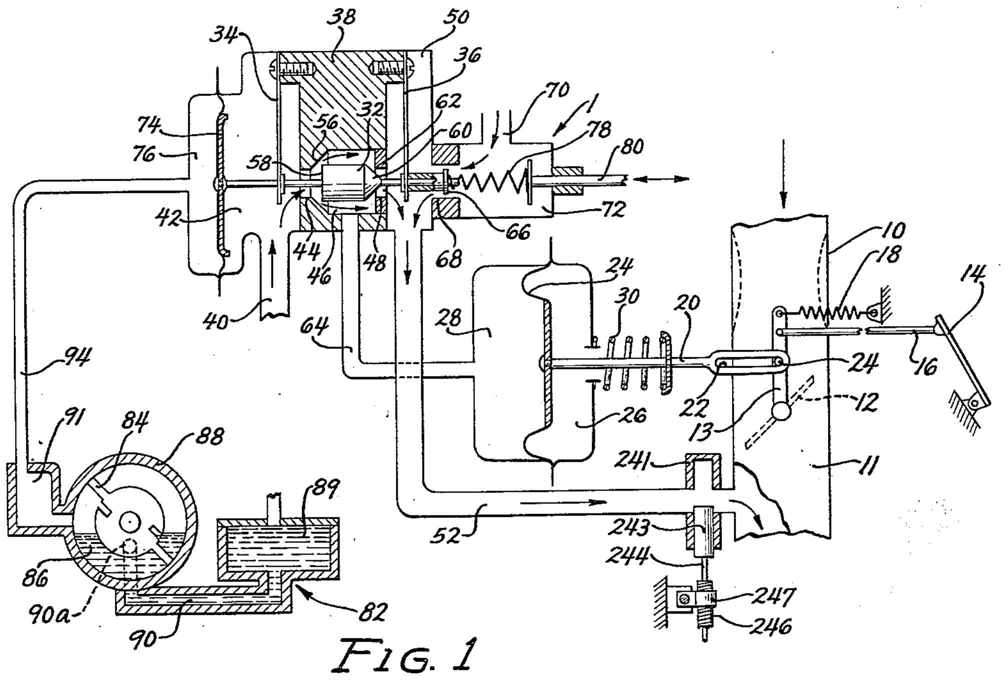
FIG. 1 is a schematic view of one form of speed regulator embodying the present invention operatively related to a carburetor and engine manifold or intake.

Referring to FIG. 1, a speed regulator 1 for an automotive vehicle is shown to illustrate the concepts of the present invention. In FIG. 1 there is shown a conventional carburetor 10 in an engine intake passage or manifold 11 and including a throttle 12 with a lever 13, operated by an accelerator 14 through a linkage 16, all biased towards an idle speed direction by an idle spring 18. The lever 13 and throttle 12 are operated by the regulator by means of an override member 20 having a slot 22 cooperating with a pin 24 carried by lever 13.

The override member 20 is actuated by a servo-motor such as diaphragm 24, or the like, having atmospheric pressure on one side thereof in chamber 26 and modulated vacuum on the other side in chamber 28. The vacuum-derived force of diaphragm 24 is biased or opposed by a spring 30 which tends to close the throttle 12 when the regulator is in operation. The vacuum in chamber 28 is modulatingly controlled by a pilot valve 32 supported for frictionless movements by a pair of leaf springs 34 and 36 suitably secured to a body 38. The pilot valve controls a fluid circuit in which air flows through an inlet 40 into an atmospheric chamber 42, through an inlet orifice or restriction 44, a valve chamber 46, an outlet orifice or restriction 48, vacuum chamber 50, and through a passage 52 to the intake manifold 11.

The pilot valve, in the form shown, includes a cylindrical valve face 58 which cooperates with a conical valve seat 56 to comprise the inlet valve for chamber 46. The pilot valve also includes a conical valve face 60 which cooperates with a cylindrical valve seat 62 of orifice 48 to comprise the outlet valve for chamber 46. The pressure in chamber 46 is transmitted to chamber 28 through a passage 64 so that the pressure in chamber 46 is substantially the same as in chamber 28. When the pilot valve moves from the seated inlet valve position to the seated outlet valve position, the pressure in chambers 46 and 28 varies gradually from the value of pressure in chamber 50 to the value of pressure in chamber 42, respectively.

A small compensating disc 66 is secured to an extension of the pilot valve by suitable means, as by soldering. The disc is disposed within a bore of a housing member 68 to provide a small perimetrical clearance therebetween, such as .004" to .006" diametrically, for example. Such clearance is maintained by the leaf springs 34 and 36 to provide frictionless movement of the entire pilot valve assembly since the elements thereof are suspended within the fluid controlled thereby without any sliding surface contact. The manifold vacuum in chamber 50 and passage 52 causes air to flow through the inlet 70 into chamber 72, through the small clearance between disc 66 and bore 68 where it joins the flow through the pilot valve, the combined air-flow then passing through passage 52 to intake passage 11.

Frictionless speed-sensing means are provided to effect movements of the pilot valve in response to changes in the speed of the engine or vehicle. In the form shown, such speed-sensing means includes a sensing diaphragm 74 which produces forces acting on the pilot valve in response to pressure in a chamber 76 varying as a function of vehicle (or engine) speed in a manner to be described. The forces of diaphragm 74 are opposed and balanced by a biasing spring 78 which is manually adjusted by a shaft 80.

The frictionless speed-sensing means also includes a signal unit or pressure generator unit, shown by way of illustration, which is generally indicated by the numeral 82 and produces the pressure in chamber 76 which varies as a function of speed, in this instance. The signal unit is of the same type as disclosed in my co-pending application, Serial No. 683,318, filed September 11, 1957. While any of my frictionless speed-sensing means may be used, this signal unit has particular utility in the regulator combination shown in FIG. 1, particularly when used as an "automatic throttle" for substantially constant speed operation of automobiles. This type of signal unit comprises a rotary vane member 84 driven by the vehicle or engine, such as by the flexible speedometer shaft (not shown), and having one or more vanes for moving liquid 86 in a circular path in a cylindrical housing 88. The liquid is supplied from an air-vented reservoir 89 through passage 90 to a vane chamber inlet 90a located near the center of the vane chamber. Liquid pressure developed by the centrifugal force of the revolving liquid is transmitted to the diaphragm 74 by means of a pressure converter or transmitter chamber 91 through a body of air trapped in a passage 94 between the liquid in the transmitter chamber and the sealed sensing diaphragm 74. Rotation of the vane element 84 at a faster rate produces more centrifugal force of the revolving liquid and hence more air pressure on diaphragm 74, and conversely.

A valve member 243 is slidable in a cylinder 241 to open and close passage 52 for activating or inactivating the regulator as required. The valve 243 is actuated in a closing direction by a flexible shaft 244 sliding in a sheath 246 in response to movements of the brake actuating mechanism (not shown). The valve 243 is opened by hand-operated means to activate the governor mechanism. The structure and operation of this valve mechanism is disclosed in more detail in my co-pending application, Serial No. 712,847, filed February 3, 1958, and corresponding elements are indicated by the same numerals; also, this reference application discloses a more detailed operation of the override member 20 in relation to throttle 12.

When the rotary speed of the vehicle and vane member 84 increases, diaphragm 74 applies more force on pilot valve 32 which then moves towards the right in FIG. 1 to increase the opening of the inlet valve at orifice 44 and simultaneously and gradually decrease the opening of the outlet valve at orifice 48. This action decreases the vacuum in chambers 46 and 28 so that spring 30 moves throttle 12 in a closing direction tending to restore the regulated speed. When the vehicle (or engine) speed decreases, the regulating action is the reverse of that above described.

The disc 66 is subjected to the same vacuum existing in chamber 50 as the area of the pilot valve exposed through orifice 48. If the area of the disc is substantially equal to this exposed valve area, then the force due to *any vacuum* in chamber 50 acting on the valve is opposed and balanced by the force of the vacuum acting on the disc. In this manner the pilot valve is made substantially independent of the variations of manifold vacuum produced by changes in throttle position and acting on the pilot valve. Without the disc 66, when the pilot valve moves towards the right as the speed increases, the opening of throttle 12 reduces which increases the vacuum acting on the pilot valve. This increase in "throttle" vacuum causes the pilot valve to move even more to the right which further closes the throttle 12, which further increases the vacuum on the pilot valve, and so on. This condition results in a severe reverse speed droop which produces violent surging of the engine. This surging action is prevented by the compensating disc 66.

For a constant value of any working fluid, such as manifold vacuum, the static unbalance force acting on the exposed area of a pilot valve of any fluid-servomechanism may vary throughout its travel, *since the effective exposed area varies.* Similarly, fluid-dynamic forces (Bernoulli forces) are produced on a pilot valve of any servomechanism by the flow of the working fluid past the valve; and such fluid-dynamic forces sometimes vary undesirably as the pilot valve travels through its range. I have found that the configuration of the pilot valve and its seats in the servomechanism illustrated in FIG. 1 produces a net total of static and dynamic fluid forces which remains substantially constant throughout the travel range of the pilot valve. This desirable result is obtained by the cylindrical valve face and conical seat for the inlet valve, and the conical valve face and cylindrical seat for the outlet valve. Thus, with this constant-force pilot valve construction, there is substantially no variation in the unbalancing fluid forces so that the pilot valve is responsive substantially solely to the signal changes, which in the example shown in vehicle speed.

It is important to appreciate that both of the foregoing two features, (1) disc compensation for source-pressure variation and (2) constant force pilot valve, are applicable to any kind of fluid servomechanism using any kind of fluid, such as air or liquid, in response to any kind or condition of a signal, such as speed, temperature, pressure, velocity, level, attitude, humidity, etc.

However, the combination of elements comprising the automotive speed regulator shown in FIG. 1 has particular utility in cooperation with an internal combustion engine having a throttle in an intake passage. If the speed droop of the regulator of FIG. 1 is too broad, then the area of the disc 66 is made slightly smaller (as illustrated) than the exposed area of the pilot valve at orifice 48. Then, as the speed increases to move the pilot valve rightwardly as above described, the resulting reduced throttle opening increases the throttle vacuum. Since the exposed valve area is slightly larger than the disc, the pilot valve is moved slightly more to the right which effects slightly more throttle closure, which in turn, reduces the speed droop. I have found that the regulator corrected in this manner will remain stable even with isochronous regulation. I have also encountered a situation in which the speed droop was reverse or negative when the disc and exposed valve area were equal. This might have been produced by severe aerodynamic forces on the throttle 12. In this instance, the disc area is made slightly larger than the exposed area of the pilot valve. Then when the speed increases and the pilot valve moves to a position to the right, the throttle opening reduces to increase the manifold vacuum, but since the area of the disc is slightly larger than the exposed area of the pilot valve in this instance, the increased vacuum causes the valve to assume a position slightly to the left of its position with a balanced disc. Hence, with this construction, the throttle 12 does not close as much when the engine load decreases. This transposition of the pilot valve increases progressively, as the throttle closes (and vacuum increases) which tends to decrease the negative droop. The disc area is worked out so that at least isochronous regulation is obtained at which point the governor is stable; if, in this instance, the disc area is made progressively larger, then any desired *positive* droop can be obtained. Thus, by proper sizing of the disc 66, substantially any desired speed droop may be obtained by this "reset" action, regardless of any disturbing factors.

The particular form of the regulator shown in FIG. 1 has further utility in cooperation with an internal combustion engine having a throttle in the air intake manifold to produce unusually stable regulation. Such stability is achieved because of the single-acting servomotor construction shown in FIG. 1 in cooperation with the balancing action of the disc 66 and the air pumping characteristics of the engine. In FIG. 1, the servomotor spring 30 tends to close the throttle and the modulated vacuum acting on diaphragm 24 tends to *open* the throttle. While the regulator mechanism is in operation, *for any fixed pilot valve position*, if the throttle suddenly moves slightly open for any reason, the vacuum in chamber 50 reduces slightly; as a result the vacuum in chambers 46 and 28 reduce correspondingly to permit the diaphragm 24 to close the throttle until the diaphragm vacuum and manifold vacuum are restored to their original values. Conversely, if the throttle suddenly closes slightly for any reason, *with the pilot valve in a fixed position*, the vacuum in chamber 50 increases which effects a corresponding but lesser increase in vacuum in chambers 46 and 28, which in turn, opens the throttle until the original manifold vacuum is restored. Thus the device acts as a pressure regulator in which the servomotor maintains the throttle in a position to maintain substantially constant values of diaphragm and manifold vacuum *for any position of the pilot valve;* and when the pilot valve assumes another position, the throttle automatically maintains another value of manifold vacuum. This type of reset operation is extremely smooth and stable since it rapidly restores the throttle position, and is made possible by the balancing and reset action of the disc 66 in the construction shown in FIG. 1.

Figures 2, 3:
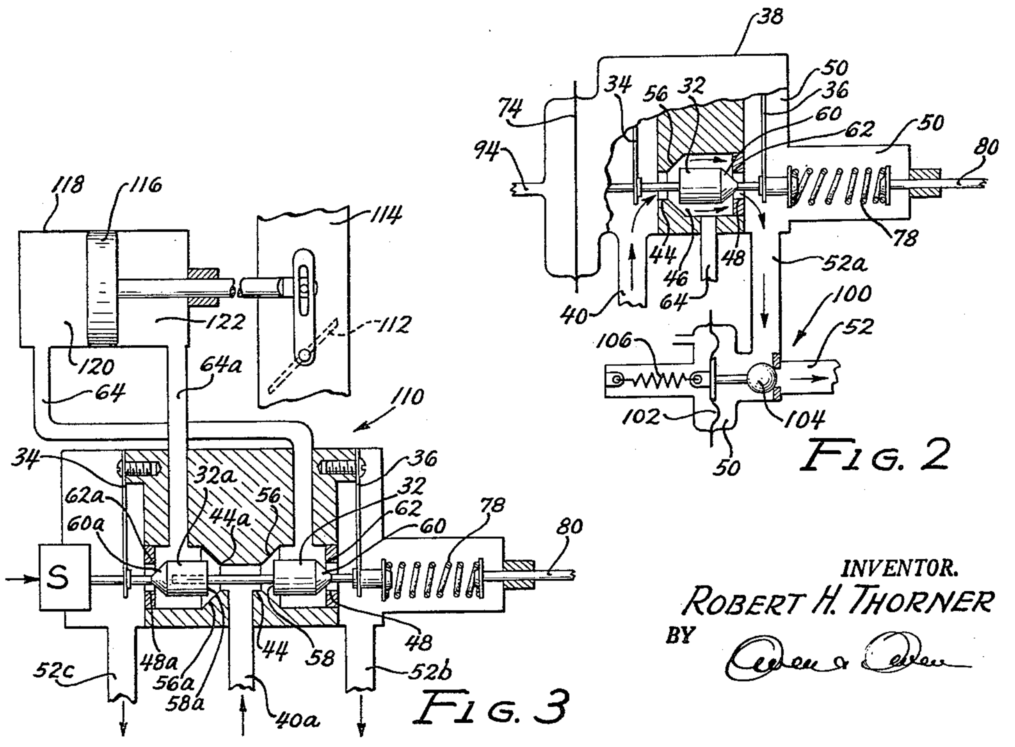
FIG. 2 is a schematic view similar to FIG. 1, showing modified means for compensating for variations in the source pressure of a fluid-servo type regulating device.
FIG. 3 is a modified form of the servo-mechanism shown in FIGS. 1 and 2 in which the novel constant force pilot valve is illustrated in a double acting servo-motor.

FIG. 2 is a modification of FIG. 1, which shows another means for compensating for variations in the source pressure in any fluid servomechanism. In FIG. 2, the elements common with those in FIG. 1 are so numbered. The only modification is that the disc 66 and air inlet 70 have been eliminated and replaced by a pressure regulator 100 installed in the main vacuum passage 52 between the pilot valve 32 and intake passage 11. The pressure regulator maintains a substantially constant vacuum (or pressure) at the exposed area of the pilot valve irrespective of variations of pressure anywhere in the air circuit, such as variations at the source (manifold vacuum). The pressure regulator illustrated in FIG. 2 is of the "series" type and comprises a diaphragm 102 connected to actuate a ball valve 104 and biased by an extension spring 106 for setting the predetermined regulated vacuum such as 5 inches of mercury, for example.

The diaphragm is exposed on one side to the vacuum in chamber 50 and on the other side to the atmosphere. Thus when the vacuum in chamber 50 acting on the diaphragm 102 (and at the pilot valve) tends to reduce, the regulator valve 104 automatically is opened by the spring 106 until the vacuum in chamber 50 is restored, and conversely. Thus the combination of the constant force pilot valve, the pressure regulator, and the elements to comprise a single-acting servomotor provide particular utility for any type of fluid servomechanism using liquid or air under vacuum or pressure, and with any type of signal such as speed, temperature, velocity, etc.

FIG. 3 illustrates the application of the constant force pilot valve to any kind of double acting servomechanism 110 operated by any kind of signal or sensor S. The elements in FIG. 3 corresponding to those of FIGS. 1 or 2 are so numbered. In FIG. 3, a throttle or other control member 112 regulates the condition being controlled, such as by controlling the flow in a passage 114, which might be the intake passage of an engine. The throttle is operated by a double acting servomotor comprising a piston 116, or its equivalent, movable in a cylinder 118 and dividing the cylinder into two chambers 120 and 122. The fluid enters the circuit at 40ᵃ and flows through orifices 44 and 48 and out through passage 52ᵇ as described in relation to FIGS. 1 and 2; the configuration and construction of the pilot valve body 32, and its seats are the same as in FIG. 1, which in FIG. 3 controls the pressure in chamber 120 through passage 64. However, in FIG. 3, the pilot valve, which is supported by leaf springs 34 and 36, also includes a second valve body 32ᵃ symmetrically arranged in relation to the valve body 32 for simultaneous and opposite control of similar orifices 48ᵃ and 44ᵃ in a branch circuit from the inlet 40ᵃ to the outlet 52ᶜ. The valve body 32ᵃ controls the pressure in chamber 122 through passage 64ᵃ to vary oppositely from that in chamber 120. Either pressure-fluid can be supplied to passage 40ᵃ or vacuum can be applied to outlets 52ᵇ and 52ᶜ.

In operation, if the signal from the sensor S increases, the pilot valve moves rightwardly against spring 78 to increase the pressure in chamber 120 (assuming pressure at inlet 40ᵃ) and decrease the pressure in chamber 122, so that piston 116 closes throttle 112, and conversely. Each portion of the pilot valve is subjected to the same source pressure (in passage 40ᵃ), and the fluid dynamic and static forces in each portion of the pilot valve are equal and substantially constant throughout its travel. Hence this double acting pilot valve is inherently balanced and is substantially independent of source pressure variations without the disc 66 of FIG. 1 or the pressure regulator 100 of FIG. 2; and the novel constant force pilot valve configuration makes this pilot valve independent of variations in fluid dynamic and static forces as the valve travels.

When the terminology in the claims recite the principles disclosed herein in terms of engine speed, it should be understood that vehicle speed and engine speed are to be interpreted synonymously in construing the invention defined by these claims. This is true, particularly for so-called "automatic throttle" devices for constant road-speed operation as shown in FIG. 1, since at higher cruising speeds, the slippage of an automatic transmission is very slight so that engine speed is very nearly proportional to road speed.

I wish it understood that my invention is not limited to any specific construction, arrangement or form of the parts, and is capable of numerous modifications and changes without departing from the spirit and scope of the claims.

What I claim is:

1. In a regulating device for controlling the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough communicating with said pressure responsive member on one side thereof and having its outlet communicating with said intake passage on the downstream side of said throttle, valve means in said circuit for controlling vacuum therein acting only on said one side of said pressure responsive member for effecting movements thereof, biasing means acting on said pressure responsive member to oppose the forces produced by said last named vacuum, sensing means responsive to changes in the speed of said engine to produce forces acting on said valve means for effecting speed regulating movements of said throttle, second biasing means acting on said valve means to oppose said sensing forces, a vacuum chamber having an aperture and communicating with vacuum in said air circuit between said valve means and said intake passage, said valve means including a portion exposed to said air circuit vacuum and adversely affected by changes in force produced on said valve portion by variations of said passage vacuum corresponding to changes of throttle position, a rigid pressure sensitive member associated with said valve means and disposed within said aperture to comprise a movable portion of a wall of said chamber, said rigid member having an area exposed to said air circuit vacuum to produce forces tending to compensate for said adverse forces, means to mount said rigid member to provide a predetermined clearance space between its perimetrical surface and the adjacent surface forming said aperture, the air which acts on said rigid member passing through said clearance space under the influence of said passage vacuum, said mounting means including substantially frictionless swingable means imparting rigidity in all except one direction and acting to support said rigid member and to maintain said perimetrical clearance in all operative positions of said rigid member for substantially frictionless movements in said one direction.

2. The combination of elements defined in claim 1, in which said vacuum acting on said pressure responsive member tends to open said throttle and said first named biasing means tends to close said throttle, whereby at fixed positions of said valve means any closure of said throttle increases said vacuum acting on said pressure responsive member to move the throttle in an opening direction to substantially its original position until the vacuum acting on said pressure responsive member is substantially restored, and conversely.

3. In a regulating device for controlling the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough communicating with said pressure responsive member on one side thereof and having its outlet communicating with said intake passage on the downstream side of said throttle, valve means in said circuit for controlling pressure therein acting only on said one side of said pressure responsive member for effecting movements thereof, biasing means acting on said pressure responsive member to oppose the forces produced by said last named pressure, sensing means responsive to changes in the speed of said engine to produce forces acting on said valve means for effecting speed regulating movements of said throttle, second biasing means acting on said valve means to oppose said sensing forces, a vacuum chamber having an aperture and communicating with vacuum in said air circuit between said valve means and said intake passage, said valve means including a portion exposed to said air circuit vacuum and adversely affected by changes in force produced on said valve portion by variations of said passage vacuum corresponding to changes of throttle position, a pressure sensitive member associated with said valve means and disposed within said aperture to comprise a movable portion of a wall of said chamber, said pressure sensitive member having an area exposed to said air circuit vacuum to produce forces tending to compensate for said adverse forces, said area of said pressure sensitive member being different from said exposed area of said valve means, said circuit vacuum acting on said two areas to effect a vacuum-produced force differential acting on said valve means and varying as a function of throttle position to reset said valve means to positions producing any desired speed-droop.

4. In a fluid device to operate a movable member in response to changes in a variable condition, the combination of a pressure responsive member operatively connected to said movable member to effect movements thereof, a fluid circuit having a source of varying fluid pressure to produce a flow of fluid therethrough and communicating with said pressure responsive member, valve means in said circuit to control pressures therein acting on said pressure responsive member to effect movements thereof in response to movements of said valve means, said valve means including a portion exposed to said circuit pressure and adversely affected by changes in force produced on said portion by said variations of said circuit pressure, sensing means responsive to changes in the variable condition to produce forces varying as a function thereof and acting on said valve means for effecting movements of said movable member, a chamber exposed to said varying circuit pressure and having an aperture therein, a pressure sensitive member producing forces acting on said valve means to compensate for said adverse effects of said forces and disposed within said aperture to comprise a movable portion of a wall of said chamber, means to mount said pressure sensitive member and to position same to provide a predetermined restrictive clearance space between its perimetrical surface and the adjacent surface forming said aperture, said fluid which acts on said pressure sensitive member being induced to pass through said clearance space by said source pressure to produce said compensating forces, said mounting means including substantially frictionless swingable means imparting rigidity in all except one direction and acting to support said member and to maintain said perimetrical clearance in all operative positions of said member for substantially frictionless movements in said one direction.

5. In a mechanism including a fluid circuit having a source of fluid pressure to produce a flow of fluid therethrough, said circuit including inlet and outlet orifices in series therein, valve means in said circuit for modulating the apertures of said two orifices oppositely and simultaneously to control pressure in said circuit between said two orifices, the improvement comprising, a movable valve member included in said valve means and having a pair of spaced valve faces cooperating with said inlet and outlet orifices, respectively, said inlet orifice including a conically shaped valve seat, the valve face which cooperates with said conical valve seat being cylindrically shaped to provide a circular and substantially line contact seating surface; the other of said valve faces being conically shaped, and the outlet orifice which cooperates with said conical valve face including a cylindrically shaped valve seat to provide a circular and substantially line contact seating surface, for maintaining substantially constant the sum of the static and dynamic fluid forces produced on said valve means by said source pressure and the resulting flow of fluid therefrom, respectively, throughout the entire travel of said valve means.

6. In a fluid device to operate a movable member in response to changes in a variable condition, the combination of a pressure responsive member operatively connected to said movable member to effect movements thereof, a fluid circuit having a source of fluid pressure to produce a flow of fluid therethrough and including inlet and outlet orifices therein, said pressure responsive member communicating on at least one side thereof with said circuit at a point between said two orifices, valve means in said circuit to control pressure therein acting on said pressure responsive member to effect movements thereof in response to movements of said valve means, sensing means responsive to changes in the variable condition to produce forces varying as a function thereof and acting on said valve means for effecting movements of said movable member, a movable valve member included in said valve means and having a pair of spaced valve faces cooperating with said inlet and outlet orifices, respectively, said inlet orifice including a conically shaped valve seat, the valve face which cooperates with said conical valve seat being cylindrically shaped to provide a circular and substantially line contact seating surface; the other of said valve faces being conically shaped, and the outlet orifice which cooperates with said conical valve face including a cylindrically shaped valve seat to provide a circular and substantially line contact seating surface, for maintaining substantially constant the sum of the static and dynamic fluid forces produced on said valve means by said source pressure and the resulting flow of fluid therefrom, respectively, throughout the entire travel of said valve means.

7. The combination of means defined in claim 6, and said fluid circuit having a pair of parallel branch circuits, the first of said branch circuits including said first named inlet and outlet orifices, and said second branch circuit including second inlet and outlet orifices having corresponding valve seats shaped similarly to those in said orifices in said first branch, and said valve member including a second pair of spaced valve faces shaped similarly to said first named corresponding pair of faces and correspondingly arranged in relation to their respective valve seats in said second branch to provide a constant sum of the static and dynamic fluid forces on said portion of said valve member in said second branch throughout its travel to counterbalance said first named sum of said static and dynamic fluid forces in said first branch, said pressure responsive member communicating on the other side thereof, at a point between said two orifices in said second branch, whereby movement of said valve means in one direction increases the opening at said inlet orifice of said first branch and at the outlet orifice of said second branch while decreasing the opening at said inlet orifice of said second branch and the outlet orifice of said first branch, and conversely, to vary the pressures oppositely on reverse sides of said pressure responsive member for effecting movements thereof.

8. The combination of means defined in claim 4, in which said fluid circuit includes inlet and outlet orifices therein, and a movable valve member included in said valve means and having a pair of spaced valve faces cooperating with said inlet and outlet orifices, respectively, said inlet orifice including a conically shaped valve seat, the valve face which cooperates with said conical valve seat being cylindrically shaped to provide a circular and substantially line contact seating surface; the other of said valve faces being conically shaped, and the outlet orifice which cooperates with said conical valve face including a cylindrically shaped valve seat to provide a circular and substantially line contact seating surface, for maintaining substantially constant the sum of the static and dynamic fluid forces produced on said valve means by said source pressure and the resulting flow of fluid therefrom, respectively, throughout the entire travel of said valve means.

9. The combination of means defined in claim 6, and said source pressure varying in operation to produce adverse force variations acting on said valve means, and pressure regulating means in said fluid circuit between said source and said valve means to maintain a substantially constant pressure differential acting thereon.

10. In a self-regulating control mechanism for automatically controlling a variable condition, control means to regulate said controlled condition, the combination of means for effecting controlled condition-regulating movements of said control means comprising, a first pressure responsive member operatively connected to said control means for actuation thereof, a fluid circuit connected to a source of varying fluid pressure to produce a flow of fluid therethrough and communicating with said first pressure responsive member, valve means in said fluid circuit for controlling pressure therein acting on said first pressure responsive member for effecting condition regulating movements thereof, sensing means responsive to changes in the controlled condition to produce forces varying as a function thereof and acting on said valve means to effect condition regulating movements of said valve means and said control means, pressure regulator means controlling pressure in said circuit acting on said valve means to compensate for the effects thereon of said variations of said pressure in said circuit, said pressure regulator comprising a diaphragm subjected on one side thereof to the regulated circuit pressure adjacent said valve means and on the other side thereof to a different pressure, regulator valve means including a movable regulator valve member, said diaphragm acting on said regulator valve member to effect movements thereof in a direction to control the pressure acting on said valve means in any desired manner irrespective of variations of said source pressure, and biasing means acting on said regulator valve member to oppose the forces of said diaphragm for establishing the values of said regulated pressures in said circuit.

11. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough communicating with said pressure responsive member on one side thereof and having its outlet communicating with said intake passage only on the downstream side of said throttle, valve means in said circuit for controlling vacuum therein acting only on said one side of said pressure responsive member for effecting movements thereof in a direction to open said throttle, said valve means including a movable valve member and a mating member cooperable therewith, spring biasing means acting on said pressure responsive member in a direction tending to close said throttle to oppose the forces produced by said last-named vacuum, the configuration of said valve member in relation to said mating member adapted to produce modulated pressures acting on said pressure responsive member to effect movement thereof as a function of the movement of said valve member, sensing means responsive to changes in the speed of said engine to produce forces acting on said valve means for effecting speed-regulating movements of said throttle, whereby at fixed positions of said valve member any closure of said throttle increases said vacuum acting on said pressure responsive member to move the throttle in an opening direction until the vacuum acting on said pressure responsive member is substantially restored, and conversely.

12. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough and having inlet and outlet restrictions therein, said circuit communicating with said pressure responsive member on one side thereof at a point between said two restrictions, and having its outlet communicating with said intake passage only on the downstream side of said throttle, valve means in said circuit for controlling vacuum therein acting only on said one side of said pressure responsive member for effecting movements thereof in a direction to open said throttle, spring biasing means acting on said pressure responsive member in a direction tending to close said throttle to oppose the forces produced by said last-named vacuum, said valve means including a movable valve member cooperating with at least one of said two restrictions to vary the restrictive effect thereof for modulating said vacuum acting on said pressure responsive member to effect movement thereof as a function of the movement of said valve member, sensing means responsive to changes in the speed of said engine to produce forces acting on said valve means for effecting speed-regulating movements of said throttle, whereby at fixed positions of said valve member any closure of said throttle increases said vacuum acting on said pressure responsive member to move the throttle in an opening direction until the vacuum acting on said pressure responsive member is substantially restored, and conversely.

13. The combination of elements defined in claim 3, in which said vacuum acting on said pressure responsive member tends to open said throttle, and said first-named biasing means tends to close said throttle.

14. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough communicating with said pressure responsive member on one side thereof and having its outlet communicating with said intake passage on the downstream side of said throttle, valve means in said circuit for controlling vacuum therein acting only on said one side of said pressure responsive member for effecting movements thereof in a direction to open said throttle, said valve means including a movable valve member and a mating member cooperable therewith, biasing means acting on said pressure responsive member in a direction tending to close said throttle to oppose the forces produced by said last-named vacuum, said valve member including a portion exposed to said air circuit vacuum and adversely affected by changes in force produced on said portion by said variations of said passage vacuum corresponding to changes of throttle position, means associated with said air circuit and subjected to said circuit-vacuum to compensate for said adverse effects of said last-named forces, sensing means responsive to changes in the speed of said engine to produce forces acting on said valve means for effecting speed-regulating movements of said throttle.

15. The combination of elements defined in claim 14, in which the configuration of said valve member in relation to said mating member is adapted to produce modulated pressures acting on said pressure responsive member to effect movement thereof as a function of the movement of said valve member.

16. In a self-regulating control mechanism for automatically controlling a variable condition, the combination of, control means to regulate said controlled condition, a pressure responsive member operatively connected to said control means for actuation thereof, a fluid circuit having a flow of fluid therethrough and communicating with said pressure responsive member, valve means including a movable valve member in said circuit for controlling pressure therein acting on said pressure responsive member for effecting movements thereof, sensing means responsive to changes in said controlled condition and providing forces acting on said valve member to effect movements thereof for producing controlled-condition regulating movements of said pressure responsive member and said control means, a fluid chamber having an aperture therein, a pressure sensitive member associated with said valve means for producing reset forces acting on said valve member to affect the regulation of said mechanism and disposed within said aperture to comprise a movable portion of a wall of said chamber, means to mount said pressure sensitive member to position same within said aperture to provide a predetermined clearance space between its perimetrical surface and the adjacent surface forming said aperture, said mounting means including substantially frictionless swingable means imparting rigidity in all except one direction and acting to support said pressure sensitive member and to maintain said perimetrical clearance in all operative positions of said member for substantially frictionless movements in said one direction, and said control means including means for causing a fluid pressure to vary as a function of the position of said control means to act on said pressure sensitive member to provide said reset forces acting on said valve means.

17. The combination of elements defined in claim 16, wherein said swingable means includes a pair of spaced substantially parallel leaf spring members, variable-force first biasing means acting on said pressure responsive member to oppose the forces thereon produced by said pressure in said circuit, the force of said first biasing means tending to vary as a function of the position of said pressure responsive member, said valve means controlling pressure on only one side of said pressure responsive member, the configuration of said valve member in relation to other elements of said valve means adapted to produce modulated pressures acting on said pressure responsive member to effect movement thereof as a function of the position of said valve member, second biasing means acting on said valve member to oppose the forces provided by said sensing means, the force of said second biasing means tending to vary as a function of the position of said valve member.

18. In a self-regulating control mechanism for automatically controlling a variable condition, the combination of, control means to regulate said controlled condition, a pressure responsive member operatively connected to said control means for actuating thereof, a fluid circuit having a flow of fluid therethrough and communicating with said pressure responsive member, valve means including a movable valve member in said circuit for controlling pressure therein acting on said pressure responsive member for effecting movements thereof, sensing means responsive to changes in said controlled condition and providing forces acting on said valve member to effect movements thereof for producing controlled-condition regulating movements of said pressure responsive member and said control means, a fluid chamber having an aperture therein, a pressure sensitive member associated with said valve member to apply forces acting thereon for affecting the positioning thereof and disposed within said aperture to comprise a movable portion of a wall of said chamber, means to mount said pressure sensitive member to position same within said aperture to provide a predetermined clearance space between its perimetrical surface and the adjacent surface forming said aperture, said mounting means including substantially frictionless swingable means imparting rigidity in all except one direction and acting to support said pressure sensitive member and to maintain said perimetrical clearance in all operative positions of said member for substantially frictionless movements in said one direction.

19. The combination of elements defined in claim 18, wherein said swingable means comprises a pair of spaced substantially parallel leaf spring members.

20. The combination of means defined in claim 4, and said swingable means comprising a pair of spaced substantially parallel leaf spring members and said valve means including a movable valve member, said pair of leaf spring members also acting to support said valve member for substantially frictionless movements in said one direction by maintaining said valve member suspended within the fluid controlled thereby completely free of surface contact other than fluid contact during operational movements thereof.

21. The combination of means defined in claim 18, and said circuit communicating with said pressure responsive member on only one side thereof, said valve member controlling pressure therein acting only on said one side of said pressure responsive member, spring biasing means acting on said pressure responsive member to oppose the forces produced by said last-named pressure.

22. In a self-regulating control mechanism for automatically controlling a variable condition, the combination of, control means to regulate said controlled condition, a pressure responsive member operatively connected to said control means for actuation thereof, a fluid circuit having a source of varying fluid pressure to produce a flow of fluid therethrough and communicating with said pressure responsive member, two restrictions in series in said circuit, one of said pair of restrictions being exposed to said varying source pressure, valve means including a movable valve member in said circuit cooperating with said last-named restriction for controlling pressure therein acting on said pressure responsive member for effecting movements thereof, said valve member having a portion exposed to said varying pressure and adversely affected by changes in force produced on said valve portion by variation in said source pressure, sensing means responsive to changes in said controlled condition and providing forces acting on said valve member to effect movements thereof for producing controlled-condition regulating movements of said pressure responsive member and said control means, a fluid chamber having an aperture therein, a pressure sensitive member associated with said valve member to apply forces acting thereon to compensate for said adverse forces and disposed within said aperture to comprise a movable portion of a wall of said chamber, means to mount said pressure sensitive member to position same within said aperture to provide a predetermined clearance space between its perimetrical surface and the adjacent surface forming said aperture, said mounting means including substantially frictionless swingable means imparting rigidity in all except one direction and acting to support said pressure sensitive member and to maintain said perimetrical clearance in all operative positions of said member for substantially frictionless movements in one direction.

23. The combination of means defined in claim 1, and said swingable means comprising a pair of spaced substantially parallel leaf spring members, and said valve means including a movable valve member, said pair of leaf spring members also acting to support said valve member for substantially frictionless movements in said one direction by maintaining said valve member suspended within the fluid controlled thereby completely free of surface contact other than fluid contact during operational movements thereof.

24. The combination of means defined in claim 1, in which said first-named biasing means comprises a spring, and the configuration of said valve means in relation to other elements of said valve means adapted to produce modulated pressures acting on said pressure responsive member to effect movement thereof as a function of the position of said valve member.

25. In a self regulating control mechanism for automatically regulating the speed of an internal combustion engine having an intake passage for the flow of air therethrough and a throttle in said passage to control said air flow, the combination of, a pressure responsive member adapted to be connected to said throttle for actuation thereof, an air circuit connected to said intake passage on the engine side of said throttle, valve means in said circuit for controlling pressure therein transmitted to said pressure responsive member for effecting movements thereof, pressure regulator means in said circuit for maintaining a predetermined air pressure at said valve means irrespective of the value of the air pressure elsewhere in said circuit, said pressure regulator means including a movable element exposed and responsive to the air pressure being controlled in said circuit adjacent to said valve means, said element including means controlling the entire flow of air passing by said valve means during said pressure regulating action, and means to produce forces varying as a function of the speed of said engine and acting on said valve means to effect speed-responsive movements thereof for producing corresponding movements of said pressure responsive member with amplified forces for moving said control means in a speed-correcting direction.

26. In a self regulating control mechanism for automatically regulating the speed of an internal combustion engine included in an automotive vehicle, said engine having an intake passage for the flow of air therethrough and a throttle in said passage in which closure of said throttle increases the vacuum in said passage on the engine side of the throttle and conversely, the combination of, a pressure responsive member operatively connected to said throttle for actuation thereof, an air circuit connected to the vacuum in said passage on the engine side of said throttle, valve means in said circuit for controlling vacuum therein transmitted to said pressure responsive member for effecting movements thereof, pressure regulator means in said circuit between said engine and said valve means for maintaining a predetermined vacuum to said valve means irrespective of the vacuum in said passage and the position of said throttle, and irrespective of the value of the air pressure elsewhere in said circuit, said pressure regulator means including a movable element exposed and responsive to the vacuum being controlled in said circuit adjacent said valve means, said vacuum transmitted to said pressure-responsive member tending to open said throttle when said last named vacuum increases and conversely, biasing means adapted to act on said pressure responsive member tending to close said throttle, means to produce forces varying as a function of the speed of a rotating element in said vehicle and acting on said valve means to effect movements thereof for decreasing said vacuum acting on said pressure responsive member as said speed increases, and conversely, to produce speed-correcting movements of said throttle.

27. In a self regulating control mechanism for automatically regulating the speed of an internal combustion engine included in an automotive vehicle, said engine having an intake passage for the flow of air therethrough and a throttle in said passage in which closure of said throttle increases the vacuum in said passage on the engine side of the throttle and conversely, the combination of, a pressure responsive member operatively connected to said throttle for actuation thereof, an air circuit connected to the vacuum in said passage on the engine side of said throttle, at least two restrictions in said circuit, said pressure-responsive member including means communicating with said circuit at a point between said two restrictions, valve means in said circuit to vary the restrictive effect of at least one of said two restrictions for modulating the vacuum in said circuit between said restrictions transmitted to said pressure responsive member for effecting movements thereof, pressure regulator means in said circuit between said engine and said valve means for maintaining a predetermined vacuum to said valve means irrespective of the vacuum in said passage and the position of said throttle and irrespective of the value of the air pressure elsewhere in said circuit, said pressure regulator means including a movable element exposed and responsive to the vacuum being controlled in said circuit adjacent said valve means, said element including means controlling the entire flow of air passing by said valve means during said pressure-regulating action, said vacuum transmitted to said pressure-responsive member tending to open said throttle when said last-named vacuum increases and conversely, biasing means adapted to act on said pressure responsive member tending to close said throttle, means to produce forces varying as a function of the speed of a rotating element in said vehicle and acting on said valve means to effect movements thereof for decreasing said vacuum acting on said pressure responsive member as said speed increases, and conversely, to produce speed-correcting movements of said throttle.

28. In a self regulating control mechanism for automatically regulating the speed of an automotive vehicle including an internal combustion engine having an intake passage for the flow of air therethrough and a throttle in said passage to control said air flow and producing a vacuum on the engine-side of the throttle which increases as the throttle closes, and conversely, said vehicle having accelerator means including a linkage operatively connected to actuate said throttle, spring means acting on said accelerator means tending to move said throttle in a closing direction, the combination of, a vacuum-responsive member adapted to act on said accelerator means to effect an increase in the opening of said throttle as the vacuum acting on said member increases, and conversely, said connection of said throttle and said vacuum responsive member including a lost motion mechanism comprising means connected to said vacuum responsive member for abutting said accelerator means in a throttle-opening direction to permit said throttle to be opened unrestrictedly at any time by operating said accelerator means irrespective of the position of said vacuum responsive member, an air circuit connected to said intake passage on the engine side of said throttle and communicating with said vacuum responsive member, valve means in said circuit for controlling vaccum therein transmitted to said vacuum-responsive member for effecting movements thereof, said valve means being adversely affected by the variations of said intake-passage vacuum accompanying changes in throttle position, means associated with said circuit to compensate for said adverse effects producible on said valve means by variation of the vacuum anywhere in said circuit, and means to produce forces varying as a function of the speed of a rotating element in said vehicle and acting on said valve means to effect speed-responsive movements thereof for producing corresponding movements of said vacuum responsive member with amplified forces for moving said control means in a speed-correcting direction.

29. In a self-regulating control mechanism for automatically controlling a variable condition, the combination of, control means to regulate said controlled condition, a pressure responsive member operatively connected to said control means for actuation thereof, a fluid circuit having a flow of fluid therethrough and communicating with said pressure responsive member, valve means including a movable valve member in said circuit for controlling fluid pressure therein acting on said pressure responsive member for effecting movements thereof, sensing means responsive to changes in said controlled condition and providing forces acting on said valve member to effect movements thereof for producing controlled-condition-regulating movements of said pressure responsive member and said control means, means associated with said control means for causing fluid pressure in said circuit acting on an area of said valve member in a first direction to vary as a function of the position of said control means, a fluid chamber in said circuit having an aperture therein, a pressure sensitive member subjected to said varying fluid pressure in a direction opposite from said first direction and disposed within said aperture to comprise a movable portion of a wall of said chamber, said pressure sensitive member having a predetermined area in relation to said valve-member-area and being operatively connected to said valve member to act thereon for providing reset forces varying as a function of the position of said control means, means to mount said pressure sensitive member to position same within said aperture to provide a predetermined clearance space between its perimetrical surface and the adjacent surface forming said aperture, said mounting means including substantially frictionless swingable means imparting rigidity in all except one direction and acting to support said pressure sensitive member and to maintain said perimetrical clearance in all operative positions of said member for substantially frictionless movements in said one direction.

30. The combination of means defined in claim 29, and said swingable means comprising a pair of spaced substantially parallel leaf spring members, said pair of leaf spring members also acting to support said valve member for substantially frictionless movements in said one direction by maintaining said valve member suspended within the fluid controlled thereby completely free of surface contact other than fluid contact during operational movements thereof.

31. In a self-regulating control mechanism for automatically controlling a variable condition, the combination of, control means to regulate said controlled condition, a pressure responsive member operatively connected to said control means for actuation thereof, a fluid circuit having a flow of fluid therethrough and communicating with said pressure responsive member to provide fluid pressure acting thereon always tending to move said control means to increase the magnitude of the controlled condition, biasing means acting on said pressure responsive member always tending to decrease the magnitude of the controlled condition, valve means including a movable valve member in said circuit for controlling said fluid pressure therein acting on said pressure responsive member for effecting movements thereof, sensing means responsive to changes in said controlled condition and providing forces acting on said valve member to effect movements thereof for producing controlled-condition-regulating movements of said pressure responsive member and said control means, means associated with said control means for causing fluid pressure in said circuit acting on an area of said valve member in a first direction to vary as a function of the position of said control means, a pressure sensitive member subjected to said varying fluid pressure in a direction opposite from said first direction, said pressure sensitive member having a predetermined area in relation to said valve-member-area and being operatively connected to said valve member to act thereon for providing compensating forces, whereby at fixed positions of said valve member any movement of said control means which tends to change the magnitude of the controlled condition causes the pressure acting on said pressure responsive member to effect movement of said control means in a direction tending to restore said last-named pressure and the magnitude of said controlled condition.

References Cited in the file of this patent

UNITED STATES PATENTS

| | | |
|---|---|---|
| 2,431,816 | Mallory | Dec. 2, 1947 |
| 2,505,292 | Mallory | Apr. 25, 1950 |
| 2,621,482 | Meade | Dec. 16, 1952 |
| 2,671,542 | Robnett | Mar. 9, 1954 |
| 2,708,979 | Reynoldson | May 24, 1955 |
| 2,835,237 | Thorner | May 20, 1958 |
| 2,912,010 | Evans | Nov. 10, 1959 |